Jan. 6, 1959     M. F. PETERS     2,867,792
RADIATION DETECTION

Filed Nov. 8, 1954     2 Sheets-Sheet 1

INVENTOR.
Melville F. Peters
BY
Martin J. Finnegan
ATTORNEY

INVENTOR.
Melville F. Peters
BY
Martin J. Finnegan
ATTORNEY

United States Patent Office 2,867,792
Patented Jan. 6, 1959

2,867,792

RADIATION DETECTION

Melville F. Peters, Livingston, N. J., assignor to Specialties Development Corporation, Belleville, N. J., a corporation of New Jersey Application November 8, 1954, Serial No. 467,431

14 Claims. (Cl. 340—227)

This invention relates to the detection of radiation, and particularly to the detection of radiation which is emitted by the molecular components of a substance as such molecular components pass from a higher to a lower rotational-vibrational energy level.

Photo-electric cells which respond to the radiation emitted by atoms and molecules when the electrons pass from a higher to a lower energy level are well known, and are used for radiation detectors when the radiation can reach the active material of the photo-cell without passing through a material which absorbs the radiation. Unfortunately, thin films of oil will absorb the radiation emitted by flames in the visible and ultra-violet regions and consequently photo-cells can not be used where oil can collect upon the windows of the cell, or oil mists contaminate the ambient atmosphere. Longer wave lengths which are called infra-red, and which arise from changes in the rotational-vibrational states of the molecules can pass through oil films without losing more than a relatively small fractional part of their energy.

Another objection to the photo-cell, and to the more recent development of a radiation-sensing element which generates an emf when subjected to radiation, is that both the photo-cell and the battery unit become ineffective at ambient temperatures of 600 degrees Fahrenheit and both are destroyed when subjected to high temperature flames. It is therefore the first object of the invention to use a radiation detector which responds to infra-red radiation at any temperature, however high.

The infra-red radiation is 99.6 percent of the total energy emitted by clear flames and the energy radiated in the visible and ultra-violet range is only 0.4 percent of the total energy. The radiation in the visible range is increased by the presence of hot carbon particles. The strongest band emitted by carbon dioxide, which is an important constituent of flames, occurs at a wave length of 4.4 microns. Other bands emitted by the flames in the infra-red range, and attributable to carbon dioxide and water vapor, are found in a wave length range between 0.95 and 2.8 microns. When radiation of these wave lengths pass into an atmosphere containing carbon dioxide and water vapor, the radiation is absorbed and the temperature of the carbon dioxide and water vapor is increased, so that if a device which is sensitive to temperature is immersed in these gases, the temperature of the sensing device will increase.

When a combustible mixture of gases and vapors are ignited, the intensity of the infra-red radiation from different parts of the flame will oscillate. These oscillations will consist of the infra-red radiation passing through a series of maximum and minimum values, and the frequency of oscillation of the radiation will be defined as the number of times the rays pass through a maximum value in one second. The total energy radiated by the flame in the infra-red region will be equal to the sum of the differences between the energy produced in a region of infra-red rays by the burning of the combustible mixture and the energy absorbed in this region by the components of the flame, so that the total energy emitted and the frequency of oscillation of the radiated energy will depend upon the size of the flame.

To refer to the size of the flame as small, medium, or large, is meaningless from the standpoint of fire detection unless the flame is compared to a standard of reference, such as comparing the volume of the flame to the volume of the compartment housing the flame, or comparing the energy radiated by the objects in the compartment to the energy radiated by the flame, or comparing the oscillating component of the flame with an oscillating beam of infra-red rays which are not initiated by a flame. Since the oscillating component and the intensity of the infra-red radiation from the flame is more easily compared with a standard source of radiation than with any other property of the flame, a flame will be referred to as a small flame if it has an oscillating component, and if the infra-red radiation reaching the detector from the flame is less intense than the radiation reaching the detector from all the other radiating bodies in the compartment, and the flame will be referred to as of medium size if the radiation has an oscillating component and the radiation reaching the detector from the flame has a greater intensity than the radiation from all the other bodies in the compartment and the flame will be referred to as large when the infra-red radiation reaching the detector from the flame has no oscillating component and the energy radiated within a specified wave band in the infra-red will be equal to the energy radiated in the same region by a black body when the temperature of the black body is the same as the temperature of the burning gases in the flame.

When the temperature of the bodies in the compartment can not be held constant because the radiation is from exhaust stacks which undergo rapid changes in temperature during the normal operation of the engine, the rate at which energy is received from the stacks by the temperature-sensing element of the detector may be far greater than the rate at which energy is received from a flame which has the maximum geometrical size it can have without damaging the compartment. Under these conditions it is not possible to use the total energy radiated as one of the criteria for a flame, since the temperature of the sensing element of the detector will experience a greater change and at a greater rate, during normal operation of the engine, than can be produced by the radiation from the flame. This flame is referred to as small, because regardless of the geometrical dimension of the flame, the energy in the infra-red radiation is less than the energy in the radiation from the bodies in the compartment. This limits the detection and identification of these rays to an examination of the characteristics of the oscillating component of the radiation. The identification can be made by connecting the voltage generated in the detector element to an oscilloscope or loud speaker. When the pattern on the screen shows well-defined oscillations and the loud speaker indicates a tone with a fairly constant pitch, the probability is great that the oscillations are produced by a rotating member in the path of the rays from the sun or a hot body and when the pattern on the screen is jagged and the sound from the speaker resembles a noise instead of a tone, the probability is great that the radiations are from a flame.

When the intensity of the infra-red radiation from the flame is greater than the intensity of the radiation from the bodies in the compartment, but not as intense as the radiations from a black body, the flame is referred to as a medium-sized flame. Under these conditions the flame is detected and identified by the oscillating component and the intensity of the infra-red rays which have sufficient energy to raise the temperature of the thermal element in the detector at a greater rate than the element can be raised by the radiation from the bodies in the compartment.

As the number of radiating regions or zones continue to increase in the flame, the infra-red radiation will increase in intensity until the radiation emitted at certain wave bands in the infra-red range will be equal to the radiation from the same bands in a black body when the temperature of the black body is equal to the temperature of the burning gases. This flame is referred to as large because the intensity of the radiation within the specified wave lengths can not be increased by increasing the size of the flame and the intensity of the infra-red radiation at any wave length can not become greater than the radiation from a black body when the temperature of the flame and the black body are the same, so that the flame can not emit an oscillating component from the central part of the flame. Since the radiation from the large flame is steady and very intense, the detection and identification of the flame is made by the detector's absorbing energy from the infra-red rays at such a high rate that the detector element will supply at least as much energy to the control circuit as was supplied by the oscillating and steady state components of the medium-sized flame to actuate the alarm.

It is therefore a second object of the invention to provide for the absorption of the infra-red radiation from a radiating body and through one or more elements of an adjustable structure cause transformation of the absorbed energy into means for actuating an alarm, whether the radiation be from a small, medium, or large flame.

A third object is to provide alarm-actuating means involving a combination of detecting and electrical means for transforming the infra-red radiation into an alarm.

A fourth object is to provide detecting means including a heated grid in a conduit connecting two chambers filled with radiation-absorbing gases adapted to flow from one chamber to the other, across said grid, to operate an alarm circuit.

A fifth object is to include a bridge circuit in the detecting portion of the system, to measure the response of the detecting means.

A sixth object is to provide a gaseous mixture including radiation-absorbing gases mixed with good heat-conducting gases, such as hydrogen and helium, to improve the heat exchange rate and thus obtain a faster response on the part of the temperature-sensing grid.

A seventh object is to provide, in a system having two gas-filled chambers connected by a tube carrying a sensing grid, a thermo-couple, thermo-pile, or thermistor in or near the ends of said tube.

An eighth object is to provide a radiation detection circuit including a membrane responsive to a change in pressure created by the absorption of infra-red rays on the part of the gas acting upon said membrane, to change the circuit's capacitance.

A ninth object is to provide, in a system including such a membrane, means including a sealed compartment into which pressure increases due to ambient temperature rise may be diverted, thus compensating for pressure changes which are not attributable to infra-red ray absorption in the gases impinging against said membrane.

A tenth object is to provide a radiation detection system including crystal structures having piezo-electric properties, said crystals being subjected to the pressure developed in a gaseous mixture by absorption of infra-red rays, and operating to generate a voltage indicative of the presence of such rays.

An eleventh object is to provide a radiation detection system including a ribbon suspended in a strong magnetic field and subjected to the pressure developed in a gaseous mixture by absorption of infra-red rays, and operating to generate a voltage indicative of the presence of such rays.

A twelfth object is to provide a radiation detection system including a single sensing element adapted to actuate an electrical alarm-operating circuit in accordance with the oscillating frequency or voltage imparted to said sensing element by reason of the application of infra-red radiation thereto.

A thirteenth object is to provide a radiation detection system including resistance elements adapted to produce a signal proportional to the intensity of the infra-red radiation applied thereto.

A fourteenth object is to provide a radiation detection system including a sensing element adapted to operate a magnetic amplifier forming part of an alarm-actuating circuit.

Figure 1:
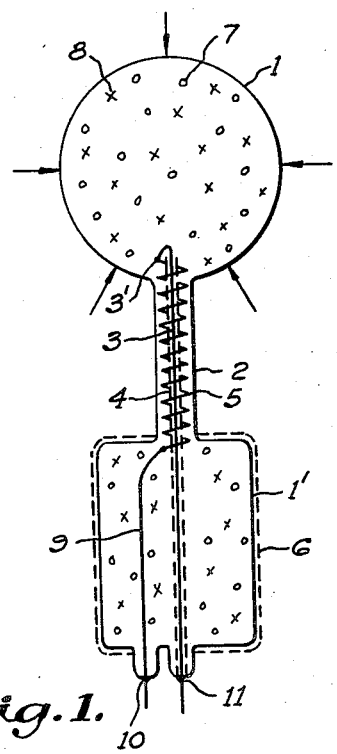
Fig. 1 is a transverse sectional view of an infra-red radiation detector embodying the invention.

The detector of Fig. 1 includes a bulb 1 of quartz, glass of high silica content, or other material transparent to infra-red radiation, the bulb 1 being connected to the tubular chamber 1' by means of a tube 2. The tube 2 houses a grid 5 supported by a wire-containing insulating tube 4, the coaxially disposed wire 3 and the tube 4 being hermetically sealed to chamber 1' as indicated at 11. One end of grid 5 is attached to the wire 3 at 3', and the other end of the grid is attached to one end of the conducting support 9 which is hermetically sealed to chamber 1' at 10. The two chambers 1 and 1' and tube 2 are filled with a mixture of gases 7 which are absorbers of infra-red rays. Examples of such gases are carbon dioxide and water vapor, or a mixture of such gases with others, such as hydrogen and helium, which are good heat conductors.

When the detector is subjected to infra-red radiation the rays pass through the transparent bulb 1 and are reflected by the opaque shield 6. The gases 7 in bulb 1 absorb the radiation, causing the temperature and pressure of the gases to rise. The pressure rise produces a gas flow through tube 2 to bulb 1', and this gas flow has a cooling effect upon the electrically heated grid 5. The infra-red energy content absorbed by gases 7 is rapidly dissipated. If the intensity of the rays is reduced, the direction of gas flow through tube 2 is reversed, causing a further lowering of the temperature of grid 5. Hence, for every cycle of oscillation of the infra-red rays, the grid 5 will pass through two cycles of heating and cooling. Since a portion of the energy absorbed by the rays will be transferred to the component parts of the detector, the average temperature of the grid will also increase.

When the infra-red radiation acting on gases 7 in bulb 1 continues to oscillate, the gas flow through tube 2 will oscillate correspondingly, and will produce an oscillating change in the resistance of the grid 5. Since the grid is absorbing energy as the gases move through tube 2, the average temperature of the grid will continue to increase until the rate of heat supply is equal to the heat loss through the supports, and by radiation and convection.

When the intensity of the flame emission of infra-red rays is constant, such as the radiation from a black body operating at a constant temperature, the temperature of the detector increases at a correspondingly constant rate.

When the detector is operated with bulb 1 elevated above bulb 1', the gases heated by grid 5 will ascend to the top of bulb 1, and the temperature of the gases in bulb 1 will be higher than that of the gases in bulb 1'. A better distribution of the heat developed by grid 5 can be obtained by operating the grid in a horizontal position.

When leads 9 and 10 of grid 5 are connected to a bridge, the oscillating component can be observed by substituting an oscilloscope across the bridge, and balancing it as a means of determining the average change in resistance.

Figure 2:
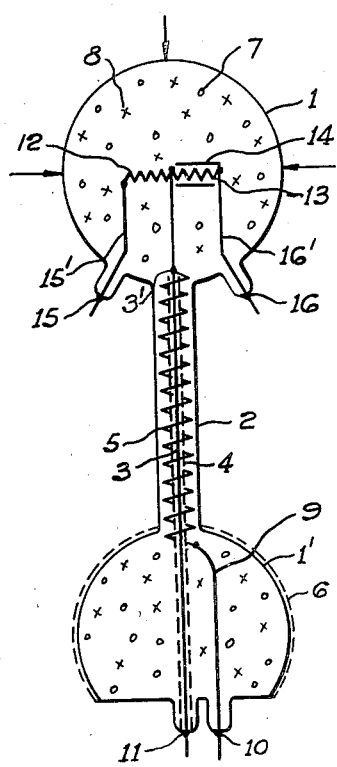
Fig. 2 is a sectional view of a second embodiment.

The rate of response of the sensing element 5 can be increased by placing a thermal element consisting of two resistors 12 and 13 in chamber 1 as shown in Fig. 2, where one end of resistor 12 is connected to lead 15' which is hermetically sealed into bulb 1, as indicated at 15, and the other end of resistor 12, along with one end of resistor 13, is connected to wire 3 at 3', the other end of resistor 13 being connected to lead 16', which is hermetically sealed to bulb 1 at 16. At 14 is a shield with a relatively large thermal capacity to control the rate at which heat can flow into or out of resistor 13, so that when the detector is subjected to a change in the intensity of the infra-red energy, the temperature of unit 13 will lag behind the temperature of unit 12 by a proportionate amount. In other respects Figs. 1 and 2 correspond.

With a grid wire of a diameter of 0.001 inch, the detector responds to oscillations of the infra-red range occurring at frequencies of 500 C. P. S., or greater.

Figure 3:
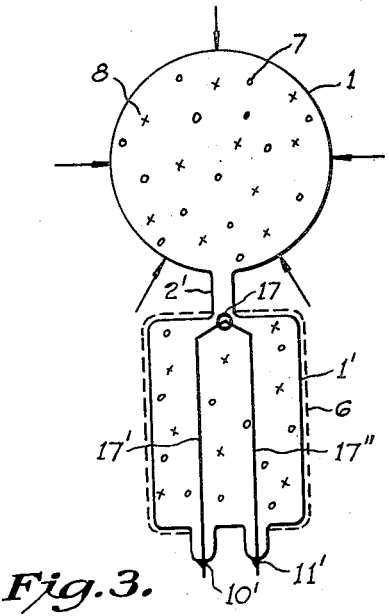
Fig. 3 is a sectional view of a third embodiment.

In Fig. 3 is shown a thermo-couple, thermo-pile, or thermistors 17 supported in or near the opening of the capillary tube 2', replacing the heated grid 5 shown in Fig. 2. The two leads and supports 17' and 17" for unit 17 are sealed to bulb 1' at 10' and 11', respectively, and the detector is sealed after filling with gases 7 and 8. If the intensity of the infra-red ray oscillates, the flow of gases between the two bulbs 1 and 1' will oscillate, and unit 17 will increase in average temperature as it oscillates. This in turn will cause generation of an alternating and increasing average voltage if unit 17 is a thermo-couple or thermo-pile, or an oscillating and increasing resistance if unit 17 is a thermistor. Both the oscillating and steady change in temperature of the sensing element can be determined as described in respect to Fig. 1, or resistors 12 and 13 may be added as shown in Fig. 2, to decrease the time of response of the detector to the steady state component of the infra-red rays.

Figure 4:
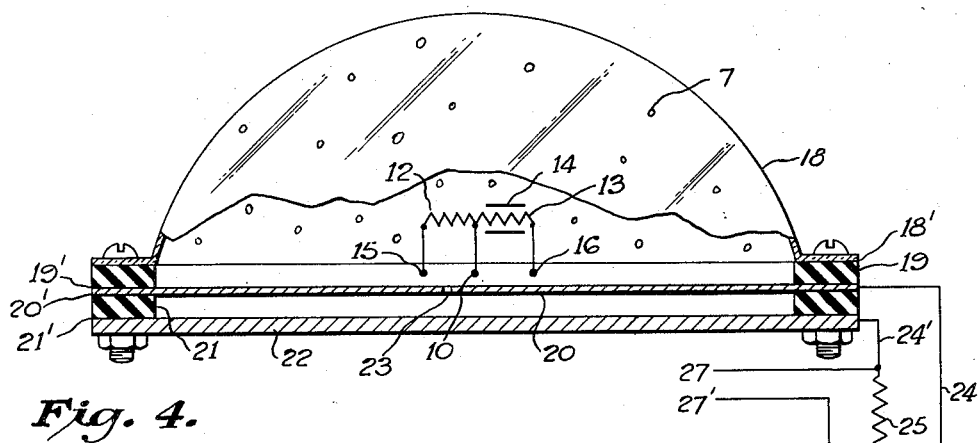
Figs. 4 and 5 are views, partly sectional and partly schematic, of other embodiments of the invention.

In Fig. 4 the window 18 is transparent to infra-red rays, and is sealed to one edge of an insulating ring 19 at 18'. The second edge of ring 19 is sealed to a membrane 20 at 19'. The membrane can be tightly stretched, or corrugated to prevent buckling under ambient temperature changes. Between membrane 20 and the heavy metal plate 22 is sealed or bonded an insulating ring 21 at 20' and 21', respectively, and at 23 is a small hole which allows the gases to diffuse slowly from one side of the membrane to the other, but not rapidly enough to equalize opposing pressures during oscillation of the diaphragm. The two leads 24 and 24' from membrane 20 and conducting plate 22, respectively, are in a circuit including battery 26 and resistor 25. When the gases 7 absorb infra-red rays the increased gas pressure moves the membrane to vary the capacitance between the membrane and the plate 22. This in turn will vary the voltage drop across the resistor 25, to actuate an alarm or other indicator in circuit with leads 27 and 27'. This type of diaphragm detector should be responsive to frequencies of at least 20,000 C. P. S., when subjected to pressure changes of a fractional part of a dyne.

Figure 5:
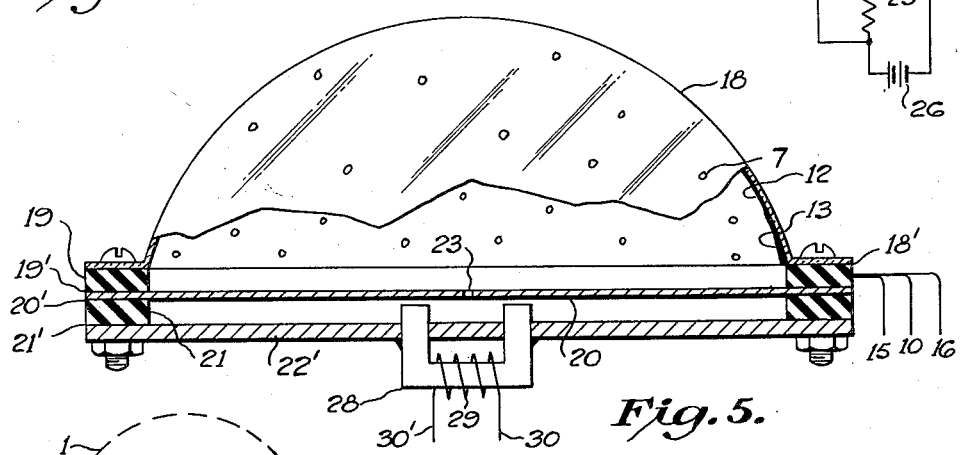

In Fig. 5 the iron core 28 is welded, brazed, or soldered to plate 22', and the coil 29 is connected to a suitable alarm circuit. The resistors 12 and 13 are painted or printed on window 18, and the time of response of 13 is made greater than 12 by using a heavier layer of paint for 13, or by shielding 13 from the rays or gases. Oscillation of diaphragm 20 generates an emf in coil 29. The five leads 30, 30', 15, 10, and 16 can be used to actuate an alarm when a voltage is developed in coil 29 and the difference in resistance between 12 and 13 exceeds a pre-established value. In other respects Figs. 4 and 5 correspond.

Other sensing units consisting of grains of carbon which change in resistance when subjected to a pressure differential, or consisting of a ribbon suspended in a magnetic field which generates a voltage when subjected to a pressure differential, or a piezo-electric crystal which develops a voltage when subjected to a pressure differential, can be utilized to serve as infra-red ray detectors in the system of Fig. 4 or Fig. 5.

Figure 6:
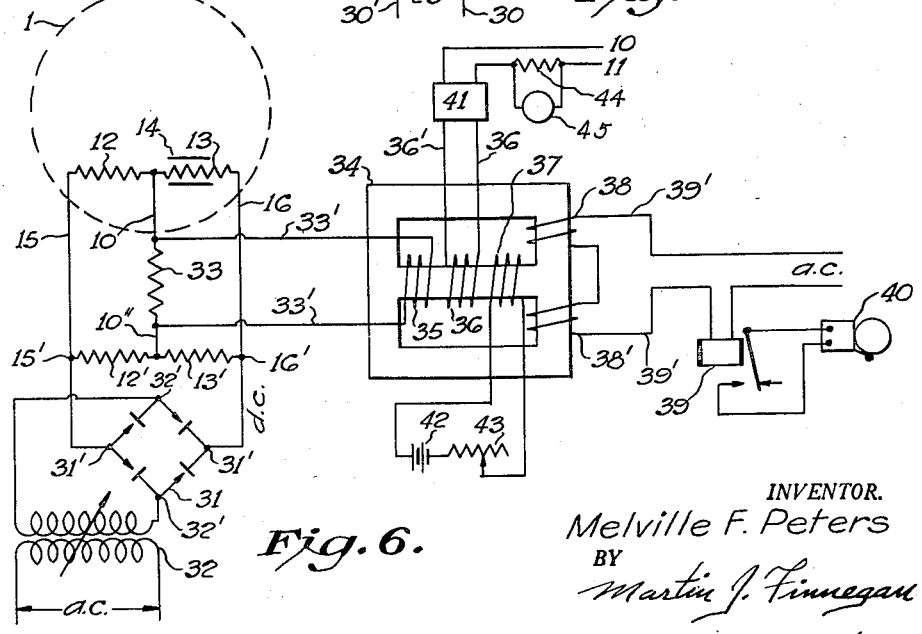
Fig. 6 is a circuit diagram of electrical components that can be used to translate the information received from the detector of Figs. 1, 2, 3, 4, or 5.

In Fig. 6 is shown one of the many types of circuits that can be used to translate the information received from the detector of Figs. 1, 2, 3, 4, or 5 into a form that allows the operator to decide if the radiation is from a small flame, a medium-size flame, a large flame, or merely from bodies located in the compartment with which the detector is associated. In this figure resistors 12' and 13' connect to resistors 12 and 13, by means of leads 15 and 16, as at 15' and 16', respectively, and the terminals 15', 16' are connected to the variable transformer 32 by way of D. C. terminals 31', 31' of rectifier 31, serving with the transformer 32 as a source of controlled power for the bridge circuit 12, 12', 13, and 13'. One end of resistor 33 is connected to the junction of resistors 12, 13 by lead 10, and the other end of unit 33 is connected to the junction of resistors 12', 13' by lead 10". The two leads 33', 33' connect control coil 35 of the magnetic amplifier 34 to the terminals of resistor 33 so that current flowing through unit 35 will be proportional to the current flowing through resistor 33.

The oscillating component of the infra-red rays is obtained by connecting the leads 10, 11 of Fig. 2, or the leads 27, 27' of Fig. 4, or the leads 30, 30' of Fig. 5 to a counter 41 supplying a voltage to control coil 36. The counter can be adjusted to deliver a voltage proportional to the oscillating frequency of the infra-red radiation, or to deliver a voltage which remains constant after the frequency becomes equal to, or exceeds, some predetermined value. The resistor 44 is placed in the leads between counter 41 and the sensing element, so that the indicator 45, which may be an oscilloscope or loud speaker, will make it possible for the operator to determine the source of the radiation. The ballast coil 37 in combination with battery 42 and adjustable resistor 43 is used to adjust the unit for maximum sensitivity in the compartment. The gate coils 38, 38' are connected to relay 39 by leads 39', 39'. The relay 39 is held open by a spring until the current in the gate coils 38, 38' reaches a predetermined value. When relay 39 closes it actuates alarm 40.

Any oscillations set up by vibrating parts will ordinarily fall in a frequency range other than that of the infra-red rays, hence such oscillations will not interfere with the correctness of the detection operation.

The operation of the indicator 45, without simultaneous operation of alarm 40, indicates radiation of slight intensity, as from a small flame. If both units 45 and 40 operate, with the unit 45 showing an oscillating frequency component, such combined indications signify a medium-sized flame. If both units 45 and 40 operate, with the unit 45 showing a steady rather than an oscillating frequency, such combined indications signify a large flame.

What I claim is:

1. In a radiation detection system, an electrical indicating circuit, means for controlling operation of said circuit, said means including a coiled oscillation-generating element sensitive to infra-red rays, and means including a frequency counting unit whose voltage output is variable along the lower range of oscillating frequencies of said coiled element, and becomes steady when the oscillating frequency exceeds a predetermined value, thereby maintaining the effectiveness of said sensitive element at any temperature, however high.

2. In a radiation detection system, an electrical indicating circuit, means including a coiled oscillation-generating element sensitive to infra-red rays for controlling the operation of said circuit, and oscillation frequency-responsive means for causing said sensitive element to vary the response of said indicating circuit in accordance with the magnitude of the flame constituting the source of said infra-red rays.

3. In a radiation detection system, an electrical indicating circuit including frequency-responsive means, a pair of gas-filled chambers having means therein reacting differently to infra-red radiation, a conduit connecting said chambers, to permit flow of gases from one of said chambers to the other, and means in said conduit sensitive to gas flowing through said conduit to cause energization of said frequency-responsive means in response to flow of gases through said conduit.

4. A radiation detection system as defined in claim 3, wherein one of said chamber means is a radiation impeding means and the other of said chamber means is a radiation admitting means.

5. A radiation detection system as defined in claim 3, wherein said energization-causing means comprises a temperature-sensitive grid disposed coaxially of said conduit, and wherein said indicating circuit includes a Wheatstone bridge controlled by said grid.

6. A radiation detection system as defined in claim 3, wherein the gases flowing through said conduit include at least one gas of good heat conductivity to accelerate the response of said circuit-operating means.

7. In a radiation detection system, an electrical indicating circuit including frequency-responsive means, a chamber containing gases whose pressure varies in response to application of infra-red rays thereto, and pressure-responsive oscillation-generating means in said chamber for the controlling operation of said indicating circuit means.

8. A radiation detection system as defined in claim 7, wherein said pressure-responsive means includes a diaphragm and means for relieving said diaphragm of pressure due to variation in ambient temperature.

9. A radiation detection system as defined in claim 7, wherein said pressure-responsive means includes an apertured diaphragm permitting diffusion of gases at a relatively slow rate that will not interfere with response of said diaphragm to pressure changes due to application of infra-red radiation.

10. In a radiation detection system, an electrical indicating circuit including frequency-responsive means, a chamber containing gases whose pressure varies in response to application of infra-red rays thereto, and thermistor means in said chamber for the controlling operation of said indicating circuit means.

11. In a radiation detection system, an electrical indicating circuit including frequency-responsive means, a chamber containing gases whose pressure varies in response to application of infra-red rays thereto, and thermo-couple means in said chamber for controlling the operation of said indicating circuit means.

12. In a radiation detection system, an electrical indicating circuit, including frequency-responsive means, and oscillation-generating means for operating said indicating circuit means, said oscillation-generating means comprising a sensing element adapted to oscillate at a frequency dependent upon the characteristics of the infra-red radiation applied thereto.

13. In a radiation detection system, an electrical indicating circuit, including frequency-responsive means, and oscillation-generating means for operating said indicating circuit means, said oscillation-generating means comprising a control element whose resistance varies in proportion to the intensity of the infra-red radiation applied thereto.

14. A radiation detection system as defined in claim 8, including a sealed compartment adjacent said diaphragm to receive the pressure applied to said diaphragm by reason of ambient temperature-induced expansion of the gases in said chamber.

References Cited in the file of this patent

UNITED STATES PATENTS

| | | |
|---|---|---|
| 2,269,674 | Liddel et al. | Jan. 13, 1942 |
| 2,443,427 | Kidder | June 15, 1948 |
| 2,611,541 | Gray | Sept. 23, 1952 |
| 2,641,711 | Tommasi | June 9, 1953 |
| 2,674,696 | Smith et al. | Apr. 6, 1954 |
| 2,698,390 | Liston | Dec. 28, 1954 |